(12) United States Patent  (10) Patent No.: US 9,185,233 B2
Saplakoglu  (45) Date of Patent: Nov. 10, 2015

(54) AUDIO COMMUNICATION DEVICE AND METHOD USING FIXED ECHO CANCELLATION FILTER COEFFICIENTS

(75) Inventor: Gurhan Saplakoglu, Lebanon, NJ (US)

(73) Assignee: Intel Deutschland GmbH, Neubiberg (DE)

( * ) Notice: Subject to any disclaimer, the term of this patent is extended or adjusted under 35 U.S.C. 154(b) by 773 days.

(21) Appl. No.: 12/786,893

(22) Filed: May 25, 2010

(65) Prior Publication Data

US 2011/0293104 A1  Dec. 1, 2011

(51) Int. Cl.
    H04B 3/20    (2006.01)
    H04M 9/08    (2006.01)

(52) U.S. Cl.
    CPC .................................. H04M 9/082 (2013.01)

(58) Field of Classification Search
    USPC ......... 381/66, 83, 93, 94.1–94.3, 94.7, 71.14,
                 381/86, 96; 379/406.01–406.14
    See application file for complete search history.

(56) References Cited

U.S. PATENT DOCUMENTS

| | | | | |
|---|---|---|---|---|
| 5,463,618 A * | 10/1995 | Furukawa et al. | ............ | 370/290 |
| 5,631,899 A * | 5/1997 | Duttweiler | ................... | 370/291 |
| 5,636,323 A * | 6/1997 | Umemoto et al. | ............ | 704/226 |
| 5,933,797 A * | 8/1999 | H.ang.akansson et al. | ... | 702/191 |
| 6,055,311 A * | 4/2000 | Dreyfert et al. | .......... | 379/406.08 |
| 6,185,300 B1 * | 2/2001 | Romesburg | .............. | 379/406.09 |
| 6,389,440 B1 * | 5/2002 | Lewis et al. | ................. | 708/322 |
| 6,542,436 B1 * | 4/2003 | Myllyla | .......................... | 367/95 |
| 6,570,985 B1 | 5/2003 | Romesburg | | |
| 6,628,780 B2 * | 9/2003 | Duttweiler et al. | ...... | 379/406.08 |
| 6,674,864 B1 * | 1/2004 | Kitamura | ...................... | 381/103 |
| 6,744,887 B1 * | 6/2004 | Berstein et al. | .......... | 379/406.08 |
| 6,778,671 B1 * | 8/2004 | Graumann | ....................... | 381/66 |
| 6,865,270 B1 * | 3/2005 | Troxel | ...................... | 379/406.02 |
| 6,931,123 B1 * | 8/2005 | Hughes | .................... | 379/406.01 |
| 7,003,095 B2 * | 2/2006 | Nakai et al. | .............. | 379/406.01 |
| 7,050,575 B1 * | 5/2006 | Romesburg | .............. | 379/406.05 |
| 7,399,353 B2 * | 7/2008 | Nun et al. | ...................... | 106/401 |
| 7,450,713 B2 * | 11/2008 | Laberteaux | ............. | 379/406.01 |
| 7,564,964 B2 * | 7/2009 | Takada | ..................... | 379/406.08 |
| 7,747,001 B2 * | 6/2010 | Kellermann et al. | .... | 379/406.01 |
| 7,817,797 B2 * | 10/2010 | Popovic et al. | .......... | 379/406.08 |
| 7,831,277 B2 * | 11/2010 | Hawker et al. | ............. | 455/556.1 |
| 7,991,146 B2 * | 8/2011 | Beaucoup | ................ | 379/406.04 |
| 8,208,621 B1 * | 6/2012 | Hsu | ......................... | 379/406.05 |
| 8,385,557 B2 * | 2/2013 | Tashev et al. | ................... | 381/66 |
| 8,654,967 B2 * | 2/2014 | Schulz et al. | ............. | 379/406.08 |
| 2002/0097864 A1 * | 7/2002 | Ljungberg et al. | ....... | 379/406.01 |
| 2005/0147230 A1 * | 7/2005 | Bershad et al. | .......... | 379/390.02 |
| 2007/0286404 A1 | 12/2007 | Popovic et al. | | |
| 2008/0219463 A1 * | 9/2008 | Liu et al. | ........................ | 381/66 |

FOREIGN PATENT DOCUMENTS

EP    0 746 134 A2    12/1996
WO    98/51066 A2    11/1998

* cited by examiner

Primary Examiner — Davetta W Goins
Assistant Examiner — Kuassi Ganmavo
(74) Attorney, Agent, or Firm — Eschweiler & Associates, LLC

(57) ABSTRACT

Methods, apparatuses, systems, and software are disclosed for providing a phone or other audio communication device with a fixed-path acoustic echo cancellation feature that compensates for a fixed-path acoustic coupling caused by transmission of sound from one or more speakers to one or more microphones through, for instance, the phone body itself.

20 Claims, 7 Drawing Sheets

US 9,185,233 B2

AUDIO COMMUNICATION DEVICE AND METHOD USING FIXED ECHO CANCELLATION FILTER COEFFICIENTS

BACKGROUND

A traditional acoustic echo canceller (AEC) is often used in phones to at least partially cancel acoustic echo caused by coupling from a loudspeaker of the phone to a microphone of the phone. The acoustic signal from the loudspeaker can travel along many acoustic paths to the microphone, such as through the air via reflections off nearby objects, and through the body of the phone itself. While the acoustic path through the phone body is typically fixed, the environment around the phone may change at any time, and so the AEC is typically adaptive to continuously change its model of the total acoustic environment.

In some phones, especially low-cost phones, the acoustic isolation between the microphone and the loudspeaker in the phone body tends to be fairly poor. This creates a fixed acoustic path within the phone body from the loudspeaker to the microphone. Furthermore, the attenuation presented by this internal acoustic path tends to be much less than the corresponding attenuation associated with the external acoustic paths. As a result, the internal acoustic path may dominate the overall acoustic coupling characteristics between the loudspeaker and the microphone of the phone, as compared with the external acoustic environment.

SUMMARY

As discussed above, the contribution of the fixed acoustic path through the phone body can sometimes dominate the contribution of the dynamic acoustic path through the external environment. Ideally, an acoustic echo canceller (AEC) should be able to handle any echo resulting from the acoustic coupling between the microphone and loudspeaker regardless of the fact that the coupling is a combination of internal and external acoustic paths. However, in practice, phones with poor microphone-to-speaker isolation perform much worse than what one would expect solely from an elevated echo level due to poor acoustic isolation.

Accordingly, various aspects as described herein are directed to providing a phone or other audio communication device (e.g., a personal computer with audio communication capabilities) with a fixed-path acoustic echo cancellation feature that compensates for a fixed acoustic path caused by transmission of sound from the speaker to the microphone through, for instance, the phone body itself.

For example, some aspects are directed to an apparatus, comprising a speaker coupled to a downlink; a microphone; and an echo cancellation module configured to filter a first signal on the downlink using a static first set of filter coefficients to generate a second signal, and to generate a third signal based on a difference between the second signal and a fourth signal that is based on sound received by the microphone.

As another example, some aspects are directed to a method, comprising filtering a first signal on a downlink of an audio communication device using a static first set of filter coefficients to generate a second signal; and generating a third signal based on a difference between the second signal and a fourth signal that is based on sound received by a microphone of the audio communication device.

Further aspects are directed to, for example, a method, comprising sending a first signal to an audio communications device such that the audio communications device generates sound based on the first signal; receiving a second signal that depends upon sound received at a microphone of the audio communications device; determining a set of filter coefficients based on the second signal; and storing the determined filter coefficients in a read-only memory of the audio communications device.

Still further aspects are directed to, for example, an apparatus, comprising a speaker coupled to a downlink; a microphone; and means for filtering a first signal on the downlink using a static first set of filter coefficients to generate a second signal, and to generate a third signal based on a difference between the second signal and a fourth signal that is based on sound received by the microphone.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
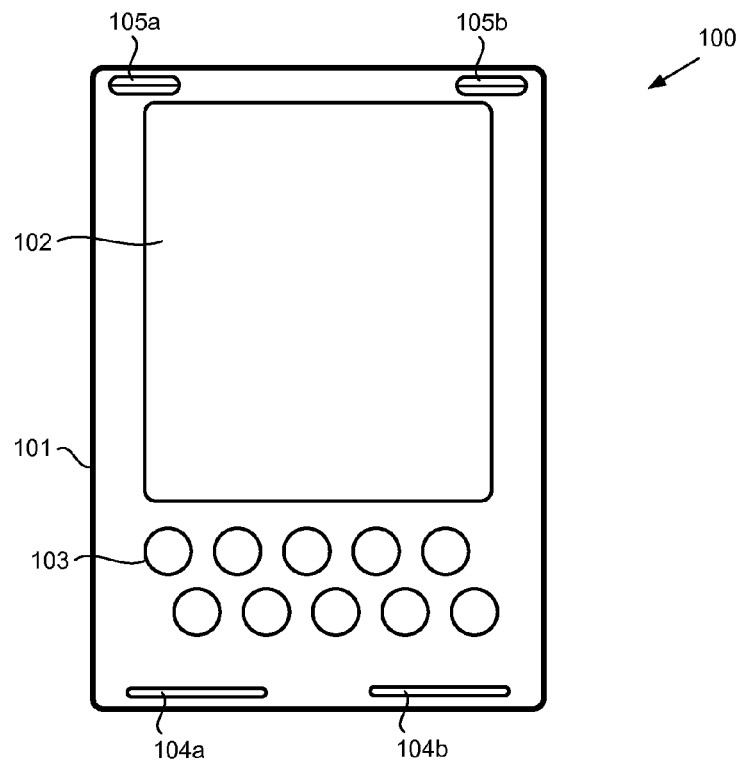
FIG. 1 is a front view of an example of a phone.

FIG. 1 is a front view of an illustrative phone 100, which in this example is a cellular telephone. However, phone 100 may alternatively be any type of communication device that is capable of providing an audio communication function. Phone 100 in this example includes a phone body 101, a display screen 102 with optional touch interface, one or more keys 103 for receiving user input, one or more microphones (such as microphones 104a and 104b), and one or more loudspeakers (such as loudspeakers 105a and 105b), also referred to herein as speakers. Speakers 105a and 105b each may be any type of one or more transducers that convert electrical signals into sound, such as a magnetic coil speaker or a piezoelectric element. Microphones 104a and 104b each may also be any type of one or more transducers that convert sound into electrical signals. Body 101 may be or include a housing and/or any of the physical elements making up phone 100. Each of the elements 102-105 may be fixed or otherwise directly or indirectly attached to body 101. The phone shown in FIG. 1 is merely an example and is unimportant, and may take one of many different forms. The overall acoustic coupling characteristics of the phone is modeled by an impulse response function that will be referred to herein as $h_{phone}$.

Because microphones 104a and 104b, and speaker 105a and 105b, have fixed physical relationships to each other, as defined by the layout of phone 100 and body 101, there is at least one fixed acoustic path between each pairing of microphones 104a and/or 104b with speakers 105a and/or 105b, and a combined fixed acoustic path between the combined pairings of microphones and speakers. The fixed acoustic path(s), which will be referred to herein as $h_{box}$, may be embodied as sound vibrations traveling from speaker(s) 105a and/or 105b through body 101 to microphone(s) 104a and/or 104b. One or more other acoustic paths, external to phone 100, may exist from speakers 105a and/or 105b, to microphones 104a and/or 104b, that involve sound emitted from speakers 105a and/or 105b traveling through the surrounding air, bouncing off one or more surfaces separate from phone 100, and reflecting into microphones 104a and/or 104b. These other external acoustic paths, collectively referred to herein as $h_{ext}$, may be unpredictably dynamic due to changes in the external environment. The overall impulse response $h_{phone}$ is the sum of $h_{box}$ and $h_{ext}$.

As mentioned previously, phone 100 may have multiple microphones and/or speakers. In such a case, $h_{box}$ and $h_{ext}$ may be the impulse responses resulting from some or all of the combined acoustic paths between the various microphones and speakers, or resulting from only a single one of those acoustic paths. For instance, where multiple microphones and speakers are implemented, there may be some modes in which only one of the microphones and one of the speakers is being used, in which case $h_{box}$ and $h_{ext}$ may represent the acoustic paths between that microphone-speaker pair. In other modes, multiple microphones and/or speakers may be used simultaneously, in which case $h_{box}$ and $h_{ext}$ may represent the combined acoustic paths between all possible microphone-speaker pairings.

Figure 2:
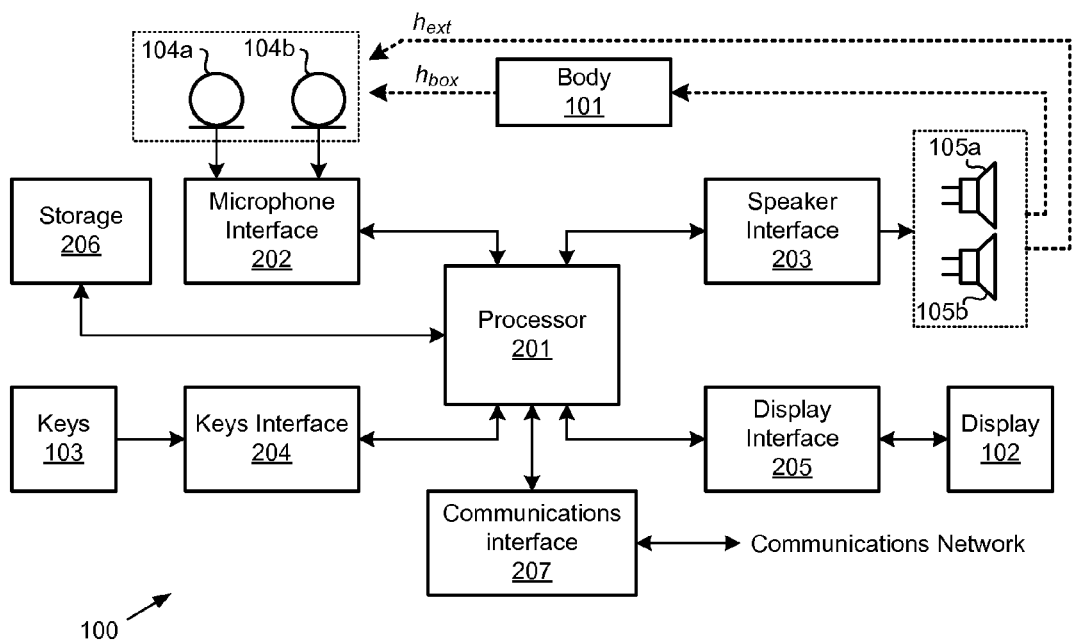
FIG. 2 is an example of a functional block diagram of the phone of FIG. 1.

FIG. 2 is an example functional block diagram of phone 100. In this example, in addition to the elements discussed previously phone 100 also includes a processor 201, a microphone interface 202, a speaker interface 203, a keys interface 204, a display interface 205, storage 206, and a communications interface 207. Although particular connectivity is shown between the functional blocks, this is merely illustrative; the functional blocks may be interconnected in any manner desired. Also, the functional blocks may be combined or further subdivided in any manner desired.

Processor 201 may be implemented as one or more physical processors (e.g., a central processing unit, or CPU) and/or other circuitry, such as one or more integrated circuit chips. Processor 201 may operate, for example, in accordance with computer-executable instructions stored in storage 206. Alternatively, processor 201 may operate solely on a hardware basis without the need for executing computer-executable instructions. In this example, processor 201 may implement and/or control any or all of the functions performed by phone 100, including but not limited to any echo cancelling functionality described herein.

Microphone interface 202 couples one or more microphones (in this example, microphones 104a and 104b) with processor 201, and provides signals to processor 201 representative of sound sensed by those microphones. Microphone interface 202 may be a separate circuit or it may be part of processor 201.

Speaker interface 203 couples one or more speakers (in this example, speakers 105a and 105b) with processor 201, and provides signals from processor 201 representative of sound to be emitted, to those speakers. Speaker interface 203 may be a separate circuit or it may be part of processor 201.

Likewise, keys interface 204 couples keys 103 with processor 201, and display interface 205 couples display 102 with processor 201. Again, either or both of these interfaces 204, 205 may be separate circuits or may be part of processor 201.

Communications interface 207 couples processor 201 with an external communications network, such as a cellular telephone network or other wireless network, and/or a wired network such as via a universal serial bus (USB) connection. Where wireless communication is provided, such communication may be via radio frequency (RF) signals (in which case communications interface 207 may include, e.g., an RF and/or BLUETOOTH antenna) and/or optical signals (in which case communications interface 207 may include an optical interface such as a light-emitting diode and/or optical receiver). The communication between communications interface 207 and the communications network may be analog and/or digital, and the signals thereof may represent voice and/or other data.

Phone 100 may include or be implemented as a computer. A computer as referred to herein includes any electronic, electro-optical, and/or mechanical device, or system of multiple physically separate such devices, that is able to process and manipulate information, such as in the form of data. A computer may be or include a general-purpose computer and/or a dedicated computer configured to perform only certain limited functions.

As is well known, a computer often includes hardware (e.g., processor 201) that executes software to perform specific functions. The software, if any, may be stored on a computer-readable medium in the form of computer-readable instructions. An example of such a computer-readable medium is storage 206. The computer (again, e.g., processor 201) may read those computer-readable instructions, and in response perform various steps as defined by those computer-readable instructions. Thus, any of the functions attributed to phone 100 as described herein may be implemented, for example, by reading and executing such computer-readable instructions for performing those functions. Additionally or alternatively, any of the above-mentioned functions may be implemented by the hardware of phone 100, with or without the execution of software. For example, phone 100 may be or include an application-specific integrated circuit (ASIC), field-programmable gate array (FPGA), or other type of circuitry that is configured to perform some or all of the functions attributed to the computer. In such embodiments, the processor may be implemented as or otherwise include the ASIC, FPGA, or other type of circuitry.

A computer-readable medium as referred to herein includes not only a single intransient storage medium or single type of such medium, but also a combination of one or more physical media and/or types of media. Examples of a computer-readable medium include, but are not limited to, one or more memories (e.g., RAM, EEPROM, or ROM), hard drives, optical discs (such as CDs or DVDs), magnetic discs, and magnetic tape drives. Such a computer-readable medium may store the above-mentioned computer-readable instructions (e.g., software) and/or computer-readable data (i.e., information that may or may not be executable).

In operation, audio (e.g., voice) signals received via communications interface 207 are provided in data form to processor 201 and/or speaker interface 203, for output as audible sound via speaker(s) 105a and/or 105b. Also, audio (e.g., voice) signals received via microphone(s) 104a and/or 104b and microphone interface 202 are provided in data form to processor 201 and/or communications interface 207 for output as a signal representative of the audio to the communications network. Such two-way audio communication is well-known and typical of a conventional phone.

In addition, processor 201, in this example, may implement an echo cancellation module by intercepting and modifying the signal presented from microphone interface 202 before supplying a corresponding audio signal to communications interface 207. Again, echo cancelling in general is well known, and is typically implemented using an adaptive finite impulse response (FIR) filter. The adaptive FIR filter may be implemented in hardware and/or software, as desired.

Figure 3:
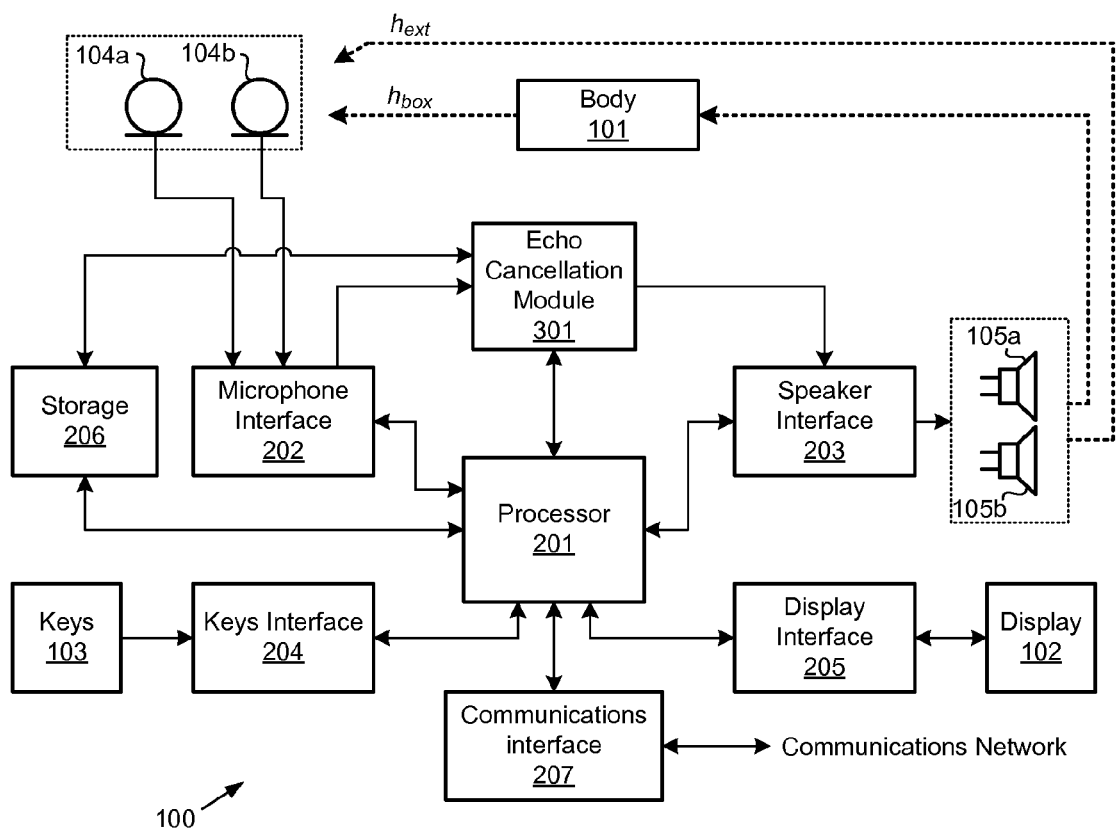
FIG. 3 is another example of a functional block diagram of the phone of FIG. 1.

In alternative embodiments, the echo cancellation functionality may be provided by a separate dedicated circuit or other type of module separate from processor 301, such as shown in FIG. 3. In this example, phone 100 further includes an echo cancellation module 301 separate from processor 201. The particular portion of phone 100 that performs the echo cancellation functionality is not necessarily important, and thus may be performed using any hardware and/or software desired.

As will now be discussed, the echo cancellation functionality may include not only conventional dynamic echo cancellation, commonly known as acoustic echo cancellation (AEC), but also fixed-path acoustic echo cancellation, which will also be referred to herein as FPEC. Thus, referring to the examples of FIGS. 2 and 3, both the AEC and FPEC functionality (shown in FIG. 4) may be performed by, e.g., processor 201 and/or echo cancellation module 301. Alternatively or additionally, some or all of AEC and/or FPEC may be implemented as dedicated hardware modules.

Figure 4:
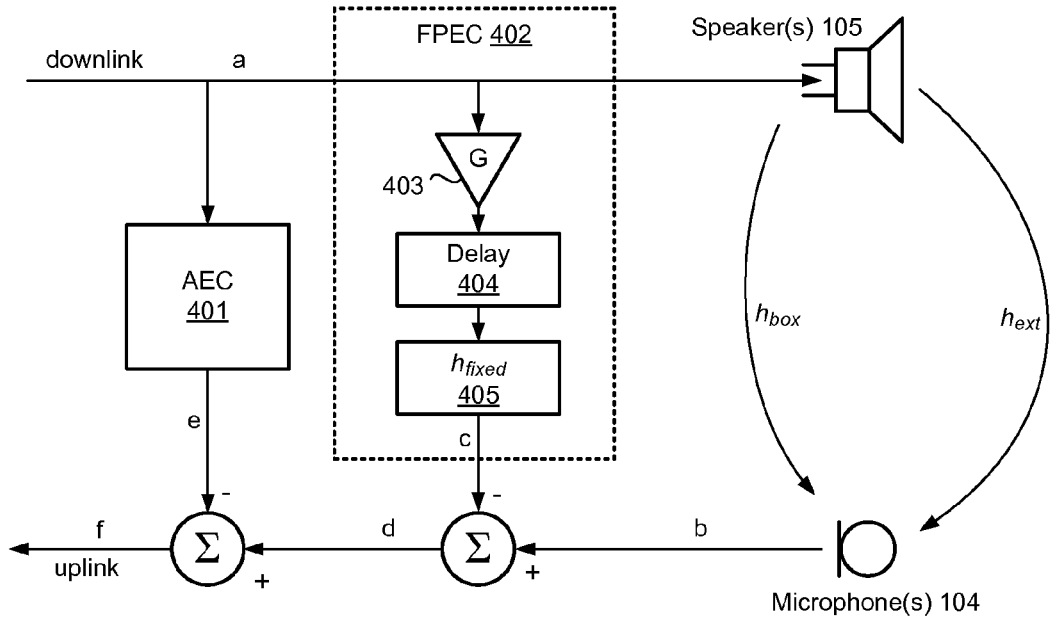
FIG. 4 is a functional block diagram of acoustic echo cancellation (AEC) and fixed-path acoustic echo cancellation (FPEC) functions that may be implemented through the functional block diagrams of FIG. 2 or 3.

FIG. 4 shows a functional block diagram of the AEC and FPEC functions that may be performed by phone 100. In this diagram, there is a downlink that provides an audio signal "a" toward speaker(s) 105a and/or 105b (collectively shown in FIG. 4 as element 105), and an uplink that transfers an audio signal "f" based at least on input at microphone(s) 104a and/or 104b (collectively shown in FIG. 4 as element 104). In terms of the examples of FIGS. 2 and 3, the downlink may be any of a variety of possible paths, or portion thereof, from the communications network to speaker(s) 105a and/or 105b, such as via communications interface 207, processor 201, echo cancellation module 301, and/or speaker interface 203. Likewise, the uplink may be any of a variety of possible paths, or portion thereof, from microphone(s) 104 to the communications network, such as via microphone interface 202, echo cancellation module 301, processor 201, and/or communications interface 207. Essentially, the signal "a" on the downlink is based on the signal received from the communications network, and the signal transmitted out to the communications network is based on the signal "f" on the uplink.

Moreover, as can be seen from FIG. 4, signal "f" is based not only on a signal from microphone(s) 104 (signal "b"), but also indirectly on signal "a" on the downlink. In particular, signal "e" is generated by AEC 401, which typically contains a filter such as an adaptive FIR filter, signal "c" is generated by FPEC 403, signal "d" is generated by subtracting signal "c" from signal "b," and signal "f" is generated by subtracting signal "e" from signal "d." Thus, in this example signal "f," is generated by subtracting both the signal generated by FPEC 402 and the signal generated by AEC 401. Of course, all subtraction and addition inputs may be reversed, as long as signal "d" represents the difference between signals "b" and "c" and signal "f" represents the difference between signals "e" and "d."

FPEC 402 may include a gain component 403 for adjusting the gain (upwards or downwards) of signal "a" as received into FPEC 402, as well as a delay module 404 for implementing a predetermined amount of delay between the signal received from gain component 403 and the signal fed into a filter 405, indicated in FIG. 4 as implementing a mathematical function $h_{fixed}$ on the output of delay 404. Filter 405 may be implemented as, e.g., a finite impulse response (FIR) filter or an infinite impulse response (IIR) filter. For purposes of further discussion, it will be assumed that filter 405 is, by way of example, an FIR filter.

Gain component 403 may provide a fixed gain that may be adjusted to improve FPEC performance at a particular volume setting. Any variation in volume from this level may be tracked and reflected in the level of signal "c". A variable gain to track the volume changes may be implemented as part of gain component 403.

The particular serial order of components 403, 404, and 405 shown in FIG. 4 is merely an example, and these elements may be rearranged in any order desired. Moreover, the operation and implementation of each individual component 403, 404, and 405 is well-known to one of ordinary skill in the art, and need not be discussed in detail.

As will be discussed further, because FPEC 402 does not necessarily need to be as precise as AEC 401, there may be substantially fewer filter coefficients for filter 405 than for the filter of AEC 401. In other words, filter 405 may be a lower-order filter than the filter of AEC 401. For example, where the filter of AEC 401 may utilize one hundred or more, or even two hundred or more, filter coefficients, filter 405 may need ten or fewer, such as seven or fewer, filter coefficients. In further embodiments, filter 405 may utilize a total number of coefficients that is much less than (e.g., 5% or less of) the total number of coefficients utilized by the filter of AEC 401.

Moreover, as will be discussed, while the coefficients for the filter of AEC 401 are dynamic and thus change over time in response to changing external environmental acoustic conditions, the coefficients of filter 405 are static, and may be expected not to change at all during the operable lifetime of the phone 100. This is because the acoustic path modeled by FPEC 402 is the acoustic path through the physical body of phone 100, the characteristics of which are not expected to change over time. Thus, once programmed into phone 100, the coefficients for the filter of AEC 401 may not depend upon any external influences such as signals on the uplink or downlink, or upon the values of the AEC 401 filter coefficients.

Different sets of non-adaptive FPEC filter coefficients may be used for different use cases. For example, one set of coefficients may be used for a handset mode and another set of coefficients may be used for a hands-free (speakerphone)

mode. The non-adaptive coefficients may remain fixed for each use case during the operable lifetime of the phone 100.

Figure 5:
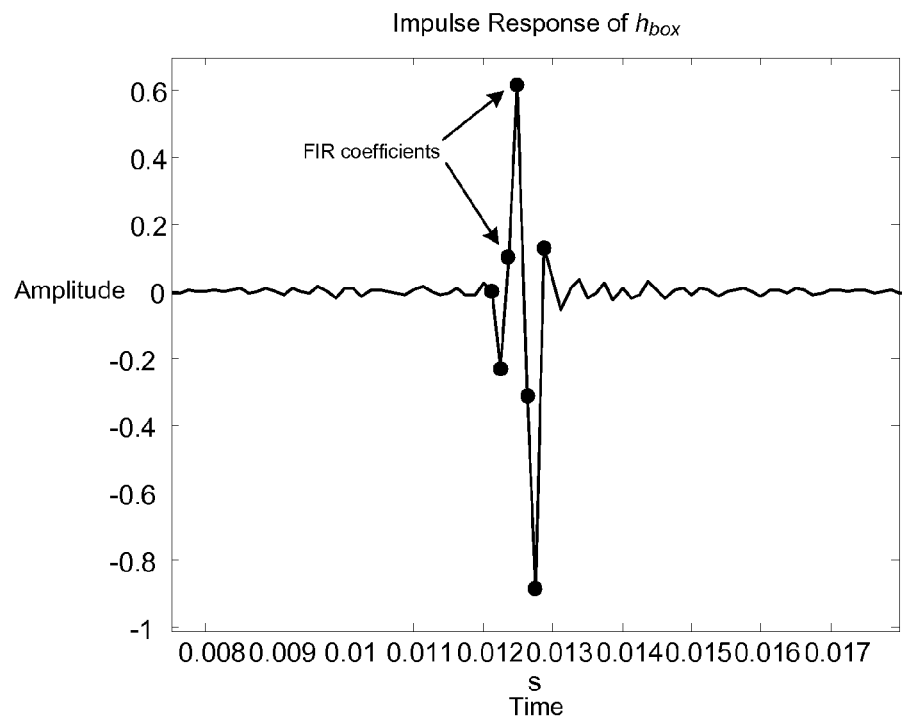
FIG. 5 represents an example impulse response associated with a fixed acoustic path caused by the body of the phone itself, under a hypothetical situation.
Figure 6:
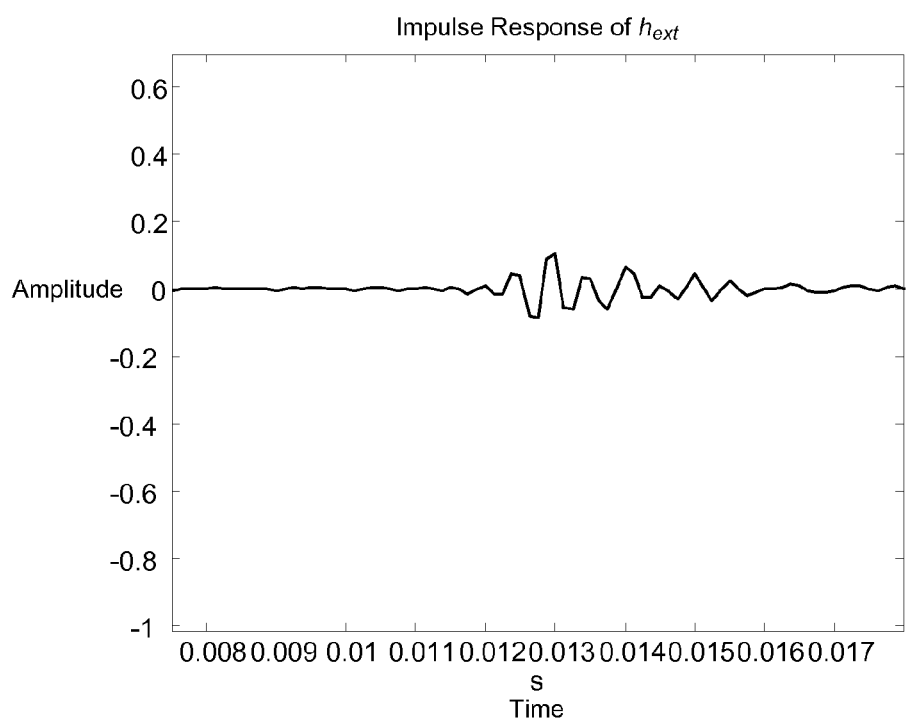
FIG. 6 represents an example impulse response associated with the external echo path under the hypothetical situation of FIG. 5.
Figure 7:
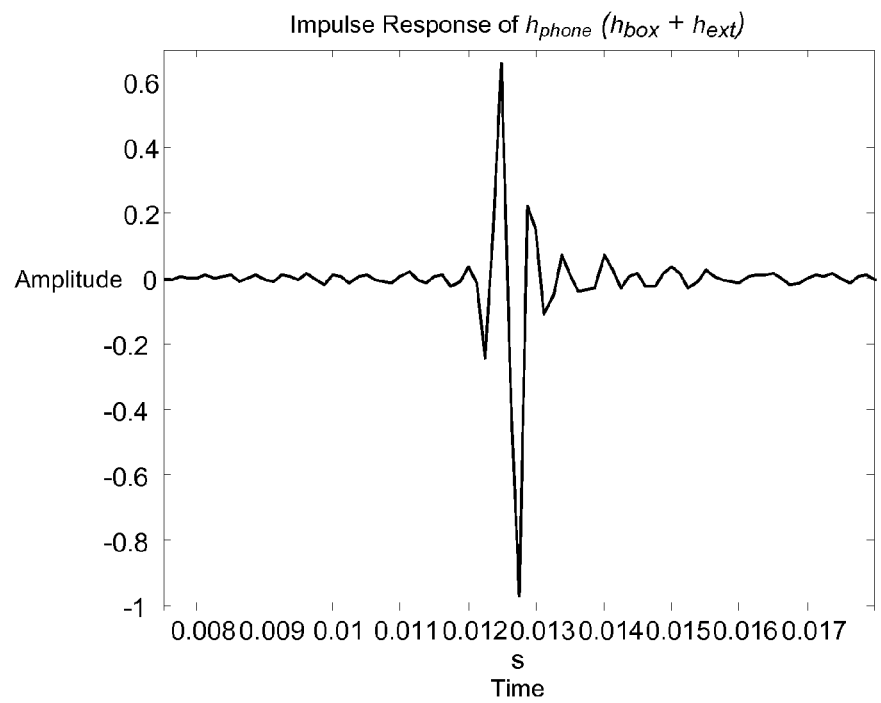
FIG. 7 represents an example overall impulse response that is the sum of the impulse responses of FIGS. 5 and 6.

While FPEC 402 may be utilized in any phone, it may be particularly useful in a poorly isolated phone, i.e., a phone in which the fixed path through the phone body provides substantial acoustic coupling from the speaker to the microphone. A hypothetical situation representing the acoustic impulse response of an example poorly isolated phone is shown in FIGS. 5-7. In this example, FIG. 7 shows the overall impulse response of the phone $h_{phone}$ consists of two components; $h_{phone} = h_{box} + h_{ext}$ where $h_{box}$ (FIG. 5) represents the impulse response associated with the acoustic path that is internal to the phone housing; and $h_{ext}$ (FIG. 6) represents the impulse response associated with the external echo path resulting from sound waves that propagate from the speaker and subsequently get reflected back to the microphone from either the external surface or of the phone or from other objects in the environment of the phone. In this example, it can be seen that $h_{box}$ is much larger than $h_{ext}$ and thus dominates the overall impulse response $h_{phone}$ of the phone.

Another observation from this example is that $h_{ext}$ varies with time due to the changes in acoustic environment, whereas $h_{box}$ is constant. As discussed previously, this is because the internal and external dimensions and structure of the phone are not expected to change with time.

Ideally, the performance of an echo canceller such as AEC 401 is solely determined by the overall impulse response of the phone $h_{phone}$. However, in practice, because typical AECs used in phones are fixed-point implementations, the AECs have finite dynamic ranges. In phones with poor acoustic isolation between the speaker and the microphone, this valuable resource—dynamic range—is wasted by handling the fixed echo components resulting from $h_{box}$. This is because the AEC filter coefficients ideally converge to $h_{phone}$, however as previously mentioned, in phones with poor acoustic isolation, $h_{phone}$ is dominated by $h_{box}$, and so most of the bits in a fixed-point implementation will be used to represent $h_{box}$, with little dynamic range remaining to represent $h_{ext}$. Furthermore, once adapted, these bits do not change with time, since $h_{box}$ is fixed as previously discussed. With the remaining bits of the filter coefficients, the AEC tries to track the variations in $h_{ext}$ as best as it can. The above arguments may apply to all fixed-point processors, even if the actual filter implementation uses a pseudo floating point algorithm involving dynamic scaling of the filter coefficients.

To improve echo cancellation performance, FPEC 402 may be added to a phone, in addition to AEC 401, so that FPEC 402 may handle much, if not all, of the adaptation to $h_{box}$, thereby leaving AEC 401 free to handle the dynamic echo path $h_{ext}$ and any remaining adaptation that may be needed with regard to $h_{box}$.

Referring again to the functional block diagram of FIG. 4, function $h_{fixed}$ in this example may be the fixed impulse response of filter 405 tuned for the particular phone 100 to at least crudely cancel $h_{box}$, which may at least partially free AEC 401 so that it may use more (if not all) of its full dynamic range to adapt to $h_{ext}$. Because a main goal may be for FPEC 402 to reduce the major contributions coming from $h_{box}$ so as to free up the dynamic range of AEC 401, it is not necessary for FPEC 402 to perfectly cancel the echo contributions of $h_{box}$. Because additional dynamic range may be available for AEC 401, it is likely that AEC 401 will be more precise at cancelling any remaining echo, both from $h_{box}$ and $h_{ext}$.

FPEC 402 may have various adjustable parameters so as to tune FPEC 402 based on a known $h_{box}$ for the particular phone 100 and for a particular use case of the same phone. For example, where filter 405 uses N coefficients, FPEC 402 may have adjustable parameters such as shown in Table 1.

TABLE 1

| Parameter | Function | Q format |
|---|---|---|
| gain | Gain (by gain component 403) | Q15 |
| delay | Delay, in number of samples, by delay module 404 | Q0 |
| h(0) | FIR coefficient 0 for filter 405 | Q15 |
| h(1) | FIR coefficient 1 for filter 405 | Q15 |
| ... | ... | ... |
| h(N − 1) | FIR coefficient N − 1 for filter 405 | Q15 |

These parameters for each phone may be set by, e.g., the manufacturer or distributor of the phone, such as on a phone model-by-model basis or on an individual phone-by-phone basis. Since FPEC 402 does not necessarily need to cancel out $h_{box}$ perfectly, the number of coefficients N may be relatively small. For example, in FIG. 5, seven example FIR coefficients, indicated by black circles on the chart, may be used to approximate $h_{box}$. Also, the Q formats depend upon the implementation, and so the Q formats in Table 1 are merely examples. In other examples, the filter coefficients may have, e.g., a Q format of Q14, Q13, Q10, etc., or for a 32 bit fixed point implementation, the Q format might be Q31, Q30, etc.

Simulation of Known Model

Figure 8:
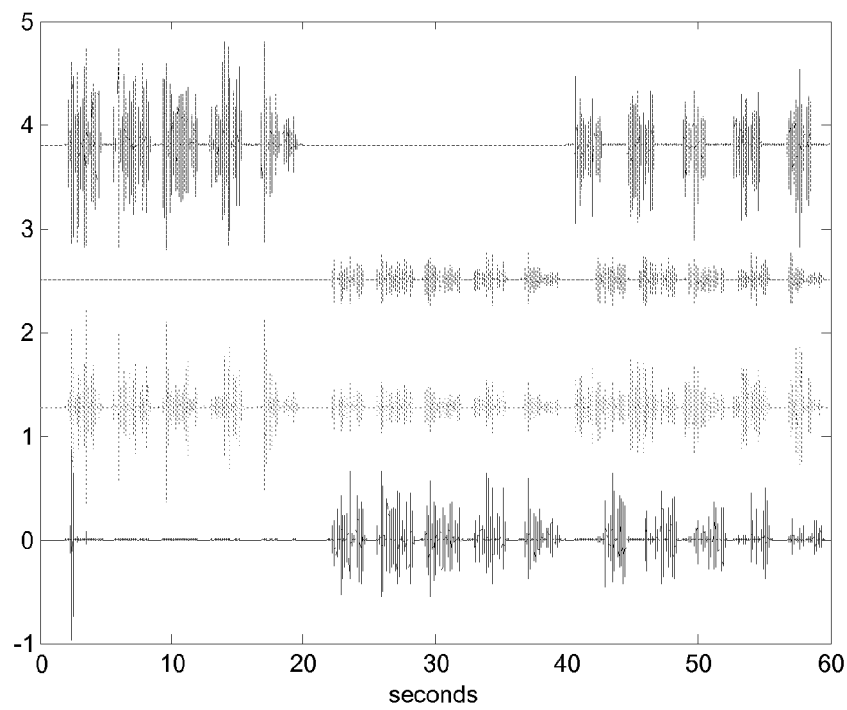
FIG. 8 represents several example input audio waveforms.

Applicant has performed a simulation using the example functions that created the impulse response waveforms of FIGS. 5-7, using input audio waveforms as shown in FIG. 8. The top waveform of FIG. 8 is the waveform as received on the downlink, the next highest waveform of FIG. 8 is the near-end speech waveform, the waveform below that is the echo plus near-end speech waveform as picked up by the microphone, and the lowest waveform in FIG. 8 is the echo-canceled uplink waveform.

The waveforms of FIG. 8 in this example are arranged to determine the performance of the simulated phone in three distinct modes of operation: single talk echo (ST) where the only source is the downlink signal driving the speaker (0 to 22 seconds), ST uplink where the only source is a near-end speaker talking into the microphone (22 seconds to 42 seconds), and double talk (DT) where both near and far end speakers are active simultaneously (42 seconds to 60 seconds). These waveforms are relevant to this discussion, because echo cancellers are typically intended to eliminate echo during ST and to transmit all near-end activity during ST uplink and DT periods.

Figure 9:
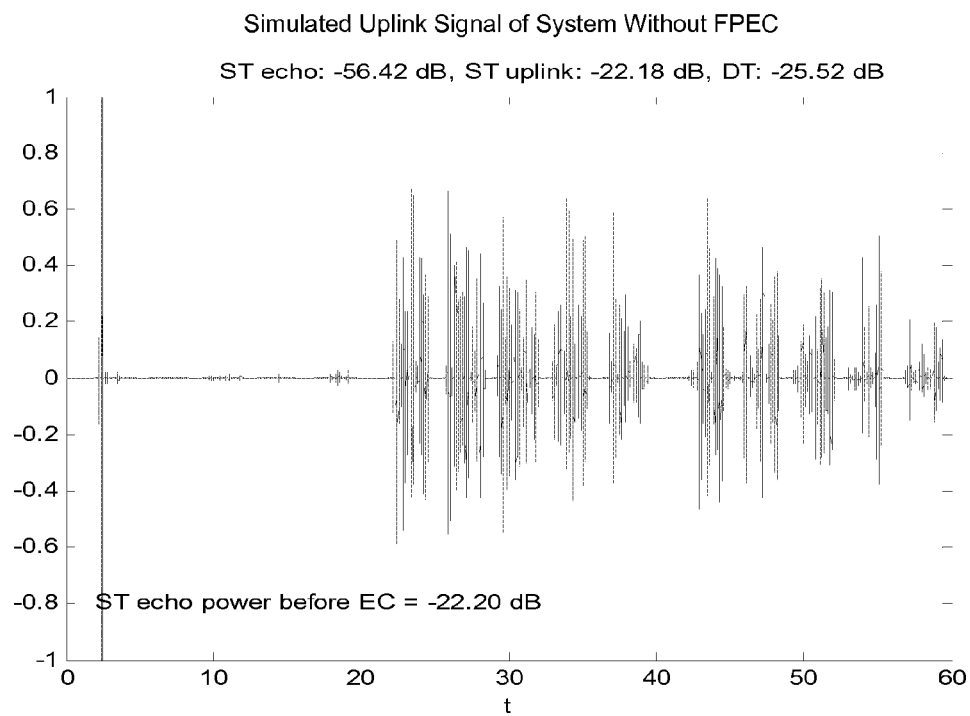
FIG. 9 represents an example simulated uplink signal of a phone not implementing an FPEC feature, using the input audio waveforms of FIG. 8 and the impulse responses of FIGS. 5-7.

Under these conditions, the comparative performance of a phone having AEC 401 alone (FIG. 9) versus phone 100 having both AEC 401 and FPEC 402 (FIG. 10) will be discussed. Power values above various example charts discussed below represent the total root-mean-square (rms) power in each operating regime, and do not take into account the initial echo that occurs before AEC has sufficient time to train.

Figure 10:
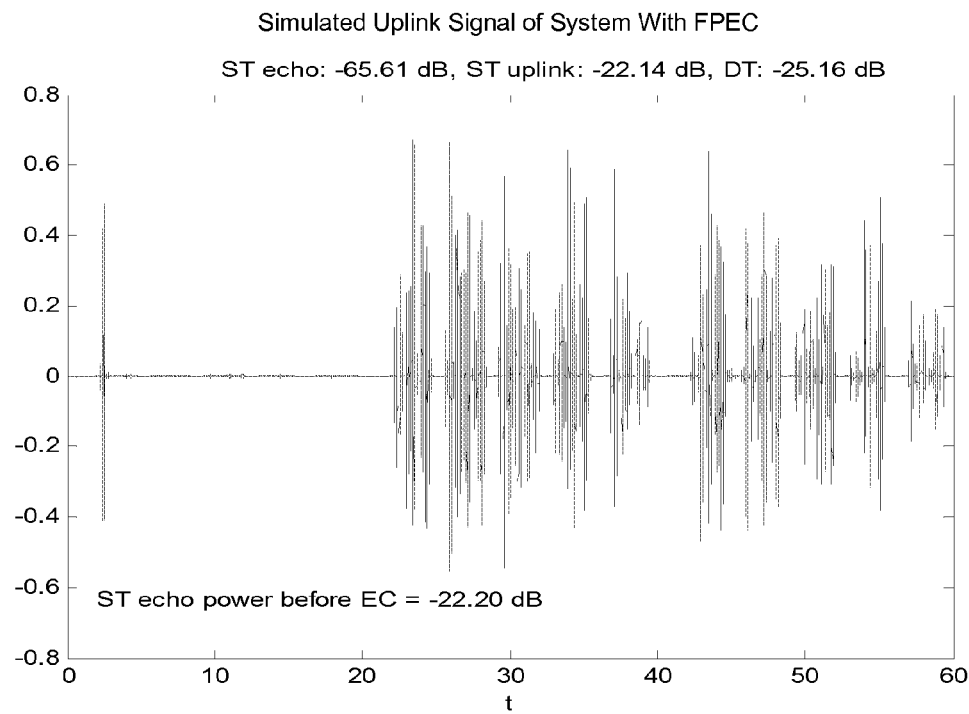
FIG. 10 represents an example simulated uplink signal of a phone implementing an FPEC feature using a seven-tap FIR filter using the filter coefficients shown in FIG. 5, and using the input audio waveforms of FIG. 8 and the impulse responses of FIGS. 5-7.

FIG. 10 shows simulation results utilizing the synthetic impulse response shown in FIG. 5 using the seven previously identified FIR coefficients that are set to their optimal values (since $h_{box}$ is known in this hypothetical case). As can be seen by comparing FIGS. 9 and 10, using FPEC 402 in this simulation has resulted in a reduction in the single-talk echo by nearly 10 dB, i.e., from −56.42 dB to −65.61 dB.

Proof of Concept—Unknown Model

The previous section analyzes an idealized case, since $h_{box}$ was known perfectly so that the coefficients/parameters of filter 405 were selected to correspond to the significant values of this known impulse response. In practice, while a fairly accurate $h_{box}$ impulse response of an actual phone can be obtained by determining the anechoic frequency response of the phone, there will invariably be some error in determining the impulse response of the phone. Thus a more practical method may be used to assess the sensitivity of the filter coefficients of filter 405 to modeling errors. For this purpose, Applicant performed tests using the impulse response of an actual phone but using the same seven coefficients utilized in the simulation discussed in the previous section. The gain and delay (blocks 403 and 404) were adjusted by trying several combinations and thus were different than the ones used in the previous section. The test results are presented in FIGS. 11 and 12, in which FIG. 11 represents the results of using the phone without FPEC and FIG. 12 represents the results of using the phone with FPEC.

Figure 11:
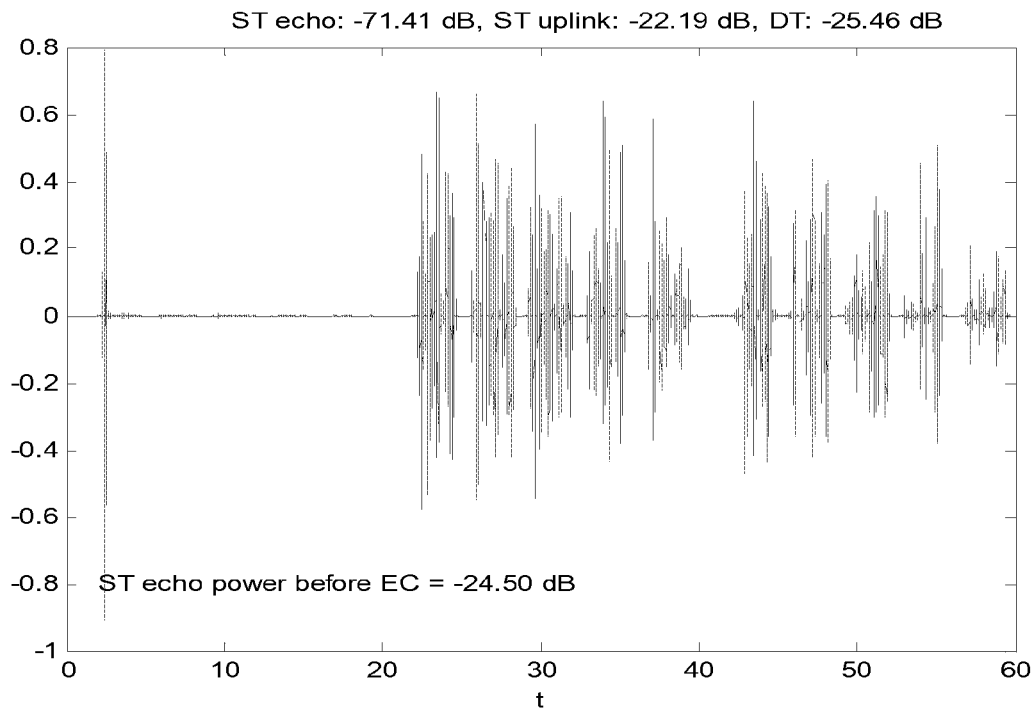
FIG. 11 represents example test results of using a phone without an FPEC feature, wherein the phone has a different impulse response than the one used to produce the results of FIGS. 9 and 10.
Figure 12:
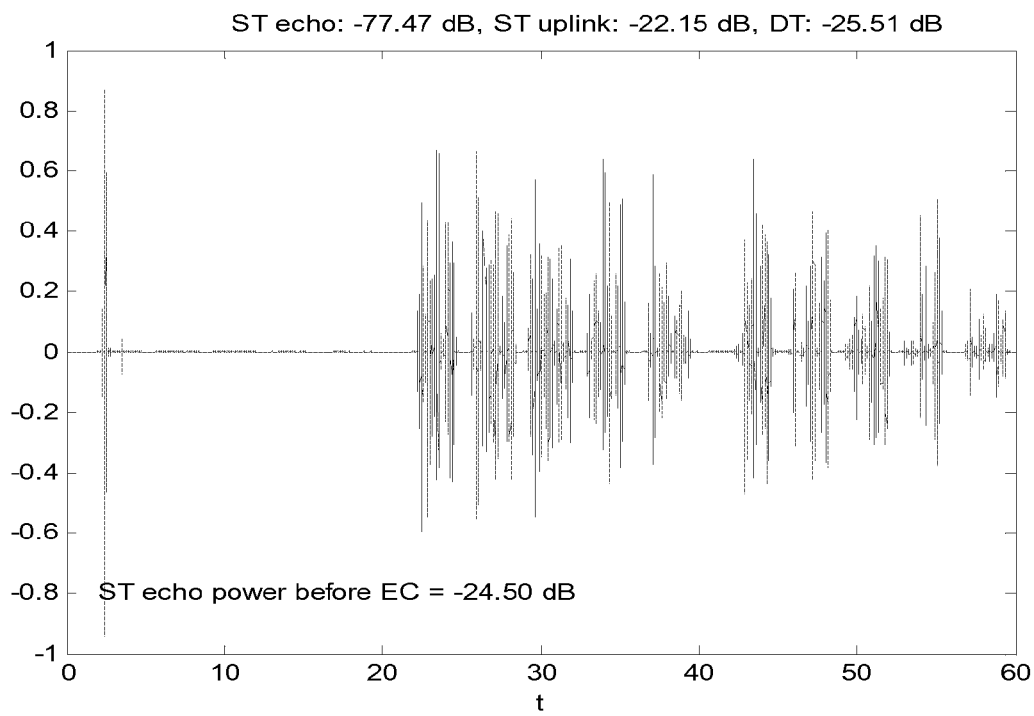
FIG. 12 represents example test results of using the same phone of FIG. 11, but with an FPEC feature using the same FIR coefficients as in FIGS. 9 and 10.

As can be seen by comparing FIGS. 11 and 12, adding an FPEC (such as FPEC 402) in this example reduces single-talk echo by about 6 dB (i.e., from −71.41 dB to −77.47 dB). The reason that the reduction is only 6 dB in this example versus a 10 dB improvement in the previously-discussed simulation is due to the non-optimal nature of the coefficients in the present example. Nonetheless, this is still a significant performance boost.

Based on the above results, it can be seen that, in practical situations, implementing filter 405 as a seven-tap filter may improve the ST echo performance by 5 to 10 dB with no impact on double-talk performance. This is a significant improvement considering the relatively small cost in adding an FPEC having a mere seven-tap filter (compared with AEC 401 which may have a multi-hundred tap filter).

Moreover, from a system resources point of view, while some buffer memory in, or otherwise used by, delay module 404 may be needed to align filter 405 with the system delay, any added memory requirement may be expected to be insignificant in terms of added cost to the phone versus added benefit. In the above-discussed simulations, Applicant found that a typical delay was about 100-120 samples. However, depending upon the particular phone, it is possible that an already-delayed signal exists within the audio subsystem of the phone that may be utilized by FPEC 402, thereby decreasing any amount of buffer memory in delay 404 that may be needed. In further embodiments, delay module 404 may not be needed at all, and/or FPEC 402 may share the resources of a delay module that already exists in AEC 401.

Determining and Programming Filter Coefficients for the FPEC

While the filter coefficients of AEC 401 are typically dynamic, the filter coefficients of filter 405 of FPEC 402 may be static, such as for the life of the phone. Moreover, because each model of phone may be different, each model of phone may have a different set of FPEC filter coefficients appropriate for that model of phone. It is also possible to customize the FPEC filter coefficients for each individual phone (as opposed to for a group of phones of the same model), although this may not be practical or necessary since FPEC 402 does not necessarily need to be precise.

Figure 13:
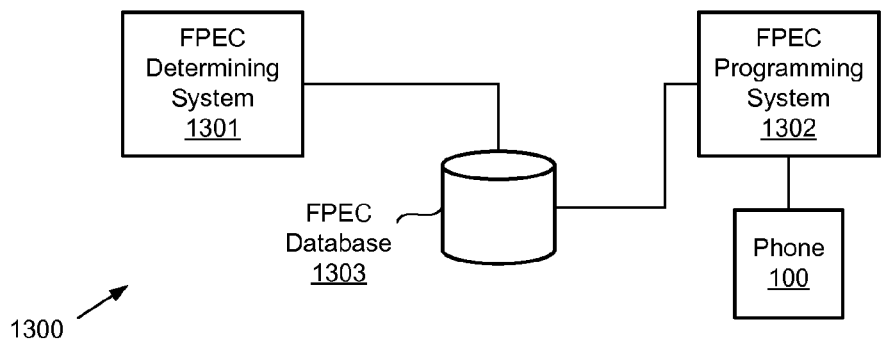
FIG. 13 is an example of a functional block diagram of a system for determining FPEC coefficients of phones and programming the coefficients into phones.

FIG. 13 is a functional block diagram of a system 1300 for determining FPEC coefficients of phones, and for programming the coefficients into phones. In this example, system 1300 includes an FPEC determining system 1301, an FPEC programming system 1302, and an FPEC database 1303.

FPEC determining system 1301 may be used for determining the FPEC filter coefficients for a particular phone or model of phone. This may be done by, e.g., physically testing a phone such as by inputting test audio signals on the downlink of the phone, measuring the resulting uplink signals generated by the phone, determining $h_{box}$ from the uplink signals, and then determining the FPEC coefficients based on the determined $h_{box}$. Once the FPEC filter coefficients are determined, data representing the values of those coefficients may be stored in FPEC database 1303 in such a manner that the coefficients are associated with the particular tested phone or with a group of phones, such the model of phone that the tested phone is representative of. The reason that entire models of phone (as opposed to individual phones) may be associated with the same FPEC coefficients is that it is reasonable to assume that each phone of the same model will have an identical or nearly identical $h_{box}$. Even if there are slight variations in $h_{box}$ from phone to phone within the same model, the dynamic AEC function may automatically compensate for those slight variations, especially since the FPEC function may be expected to free up resources of the AEC function due to the FPEC function compensating for the larger components of the static $h_{box}$.

An example of how the FPEC coefficient data may be stored and associated with a particular phone or model of phones is shown below in Table 2. In this example, there are seven FPEC coefficients for two of the models and six FPEC coefficients for one of the models. Thus, there may be any number of FPEC coefficients for each model, as desired. While generic model identifiers (1, 2, 3, . . . ) and FPEC coefficients (A, B, C, . . . ) are shown in Table 2, actual model identifiers (e.g., model numbers) and actual FPEC coefficient values would be stored.

TABLE 2

| Phone Model | FPEC Coefficients |
| --- | --- |
| 1 | A, B, C, D, E, F, G |
| 2 | H, I, J, K, L, M |
| 3 | N, O, P, Q, R, S, T |
| . . . | . . . |

FPEC database 1303 may be or include any one or more intransient computer-readable media, and may be organized as an actual database or in any other manner desired. FPEC database 1303 may be writable to and/or readable by FPEC determining system 1301 and FPEC programming system 1302.

Once the FPEC coefficients for a particular model or other grouping of phones has been determined and stored in FPEC database 1303, FPEC programming system 1302 may actually program one or more phones by providing the appropriate FPEC coefficients stored in FPEC database 1303 to one or more phones. To do so, one or more phones to be programmed may be simultaneously (or one-at a time) coupled to FPEC programming system 1302. The phones may be coupled to FPEC programming system 1302 via one or more wired connections, or wirelessly such as via a wireless local area network or a cellular telephone network. FPEC programming system 1302 may obtain the FPEC coefficients from FPEC database 1303 corresponding to the phones to be programmed, and may send one or more data messages to those phones containing or otherwise representing the values of the FPEC coefficients. Those messages may be sent to the phones via the wired or wireless connection, as desired.

Alternatively, modules containing a memory for storing the FPEC coefficients may be programmed, even prior to those modules being installed into the phones. For example, each phone may have a non-volatile and/or read-only memory, such as an electrically-erasable programmable read-only memory (EEPROM) or other electrically-erasable programmable non-volatile memory, into which the FPEC coefficients (and/or any other data as desired) may be burned/stored, and the EEPROM may be burned either prior to installation into the phone or after installation into the phone. Thus, where an EEPROM or similar nonvolatile memory is used by the phone for storing the FPEC coefficients, FPEC programming system 1302 may include an EEPROM burner or the like, as appropriate for causing the FPEC coefficients to be stored in the nonvolatile memory. Referring to the examples of FIGS. 2 and 3, the EEPROM or other nonvolatile memory for storing the FPEC coefficients may be (or may be part of) storage 206.

FPEC determining system 1301 and FPEC programming system 1302 may each be or include a computer and one or more communication interfaces for communicating with FPEC database M03 and/or the phones to be programmed.

The blocks of FIG. 13 are functional blocks, and so the physical realization of these functional blocks may differ from the functional separation shown. For example, system 1300 may be entirely at a single physical location and controlled by a single entity (such as a phone manufacturer), or it may be physically distributed into several systems at several different locations, each of which may be controlled by a different entity. In some embodiments, FPEC determining system 1301 and FPEC programming system 1302 may be separate systems, whereas in other examples they may be the same system, such as the same computer.

Figure 14:
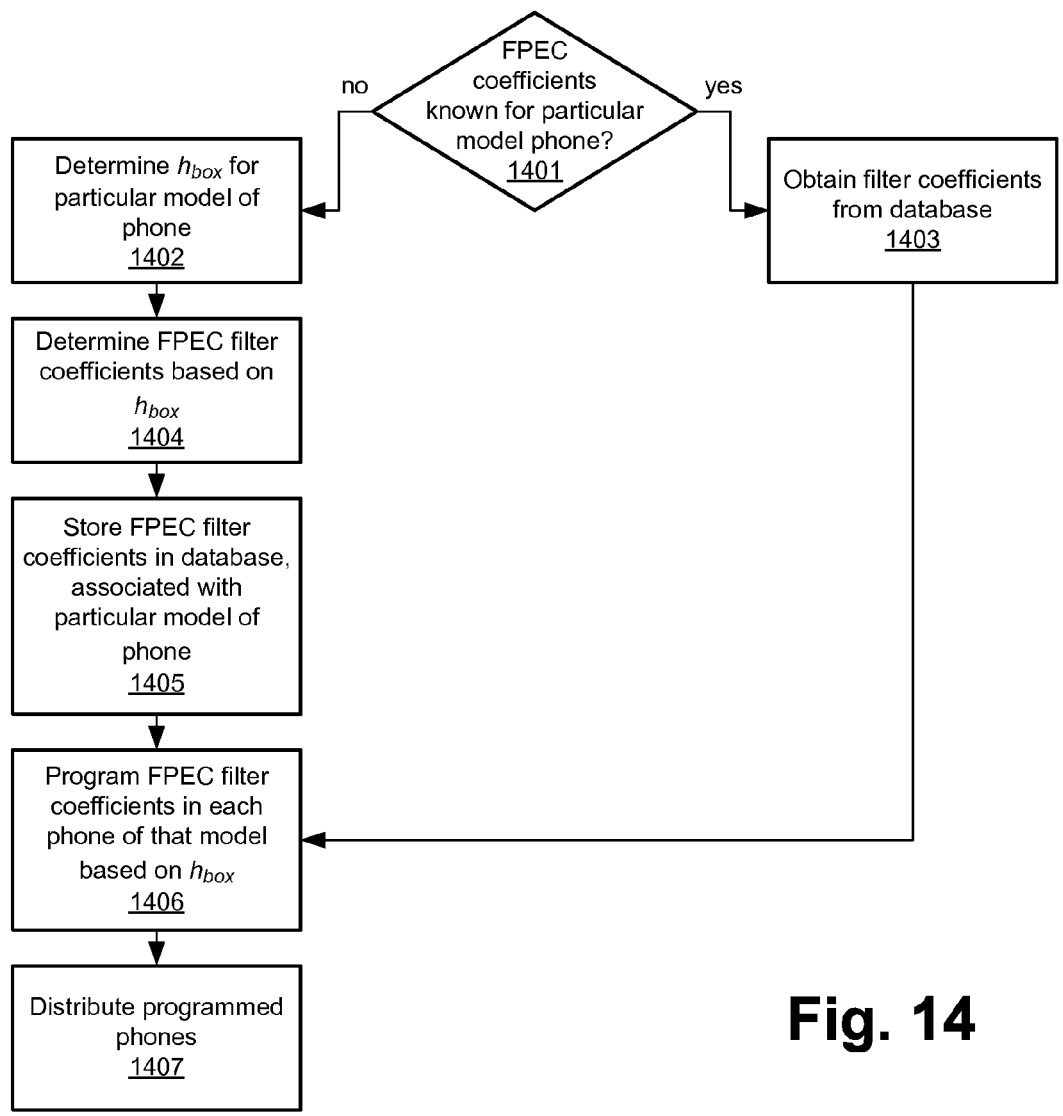
FIG. 14 is an example flowchart of a method that may be performed by or using the system of FIG. 13.

FIG. 14 is a flowchart showing an illustrative process for determining and programming FPEC filter coefficients, that may be performed by or using some or all of system 1300. The blocks of FIG. 14 may all be performed by a single party, or different blocks of the method may be performed by multiple different parties.

At block 1401, it may be determined whether the FPEC filter coefficients are known for a particular phone or model of phone. If not, then the FPEC filter coefficients may be determined, such as by using FPEC determining system 1301. For instance, FPEC determining system 1301 may generate and send signals into the downlink of a phone so that audio is generated by the speaker of the phone, and may further receive and analyze the resulting signal on the uplink of the phone generated by audio from the speaker picked up by the microphone of the phone, as modified by $h_{box}$. Since the signals sent on the downlink and received on the uplink may be known, $h_{box}$ can be determined (FIG. 14, block 1402) using known mathematical techniques. And, once $h_{box}$ is known, the desired number of FPEC filter coefficients may be determined at block 1404, such as in the manner described previously with respect to FIG. 5.

Next, at block 1405, the determined FPEC filter coefficients are stored in a computer-readable medium and associated with an identification of the phone or model of phones to which the FPEC coefficients apply. For example, this information may be stored in FPEC database 1303.

Next, at block 1406, the determined FPEC coefficients may be retrieved from storage (e.g., from FPEC database 1303) and programmed into one or more phones that the FPEC coefficients are associated with. This may be performed by, e.g., FPEC programming system 1302 as described previously. Where FPEC database 1303 accepts queries, FPEC programming system 1302 may send a query to FPEC database 1303 identifying the phone or model of phone, and FPEC database 1303 may return the FPEC coefficients associated with that identified phone or model of phone.

Returning to block 1401, if the FPEC coefficients are already known for a given phone or model of phones, then blocks 1402-1405 may be skipped as to those phones, and the FPEC coefficients may be simply programmed into the phones at block 1406.

At block 1407, the programmed phones may undergo additional processing before or after FPEC coefficient programming, and once they are ready, they may be distributed to customers, such as retailers or end users.

Thus, various example systems, apparatuses, methods, and software have been described that may allow a phone to more efficiently compensate for echo due to a fixed acoustic path using a fixed-path echo cancellation module, thereby potentially freeing resources by a conventional acoustic echo cancellation module in the same phone. While phones have been discussed having both AEC and FPEC features, it is possible for a phone to have only the FPEC feature without the AEC feature. Moreover, while phones in particular have been discussed by way of example, the various features described herein, including FPEC, may be utilized in any type of mobile or non-mobile audio communication device, and not just limited to phones.

The invention claimed is:

1. An apparatus, comprising:
a downlink;
and
an echo cancellation module configured to filter a first signal on the downlink using a dynamic set of filter coefficients and one static set of filter coefficients selected from a static first set of filter coefficients and a static second set of filter coefficients to generate a second signal, and to generate a third signal based on a difference between the second signal and a fourth signal that is based on sound received by a first microphone,
wherein the echo cancellation module is configured to use the static first set of filter coefficients for a first mode of operation and the static second set of filter coefficients for a second, different mode of operation and wherein the one static set of filter coefficients for the first mode of operation improves a single talk echo performance by about 5 to 10 dB compared to filtering the first signal using only the dynamic set of filter coefficients.

2. The apparatus of claim 1, wherein values of the static first set of filter coefficients do not depend upon values of a second set of filter coefficients.

3. The apparatus of claim 1, wherein the apparatus is further configured to generate a sixth signal based on a difference between a fifth signal and the third signal.

4. The apparatus of claim 3, wherein the apparatus is further configured to wirelessly transmit a signal based on the sixth signal to a communication network.

5. The apparatus of claim 1, further comprising a read-only memory storing the first set of filter coefficients.

6. The apparatus of claim 1, further comprising an electrically-erasable programmable memory (EEPROM) storing the first set of filter coefficients.

7. The apparatus of claim 1, wherein the echo cancellation module comprises a processor.

8. The apparatus of claim 1, further comprising a second microphone, wherein a fourth signal is further based on sound received by the second microphone.

9. The apparatus of claim 1, further comprising a second speaker coupled to the downlink.

10. The apparatus of claim 1, wherein the first mode of operation is a handset mode and the second mode of operation is a handsfree mode.

11. A method, comprising:
filtering a first signal on a downlink of an audio communication device using a dynamic set of filter coefficients and a static first set of filter coefficients to generate a second signal;
generating a third signal based on a difference between the second signal and a fourth signal that is based on sound received by a first microphone of the audio communication device; and
wherein filtering the first signal includes selecting the static first set of filter coefficients from a first static first set of filter coefficients for a first mode of operation and a second, different static first set of filter coefficients for a second, different mode of operation, wherein selecting the static first set of filter coefficients for the first mode of operation improves a single talk echo performance by about 5 to 10 dB compared to filtering the first signal using only the dynamic set of filter coefficients, 12. The method of claim 11, further comprising generating sound from a speaker of the audio communication device based on the first signal.

13. The method of claim 11, wherein values of the first set of filter coefficients do not depend upon values of a second set of filter coefficients.

14. The method of claim 11, further comprising generating a sixth signal based on a difference between a fifth signal and the third signal.

15. The method of claim 14, further comprising wirelessly transmitting a seventh signal based on the sixth signal to a communication network.

16. The method of claim 11, further comprising storing the first set of filter coefficients in a read-only memory of the audio communication device.

17. The method of claim 11, further comprising storing the first set of filter coefficients in an electrically-erasable programmable memory (EEPROM) of the audio communication device.

18. The method of claim 11, wherein the fourth signal is further based on sound received by a second microphone of the audio communication device.

19. An apparatus, comprising:
a first speaker coupled to a downlink;
a first microphone; and
an echo cancellation module configured to filter a first signal on the downlink using a static first set of filter coefficients to generate a second signal, and to generate a third signal based on a difference between the second signal and a fourth signal that is based on sound received by the first microphone,
wherein the echo cancellation module is further configured to filter the first signal using a dynamic second set of filter coefficients that change over time to generate a fifth signal, and
wherein addition of the static first set of filter coefficients in the echo cancellation module is configured to improve a single talk echo performance by 5 to 10 dB compared to filtering the first signal using only the dynamic set of filter coefficients, 20. A method, comprising:
filtering a first signal on a downlink of an audio communication device using a static first set of filter coefficients to generate a second signal; and
generating a third signal based on a difference between the second signal and a fourth signal that is based on sound received by a first microphone of the audio communication device,
filtering the first signal using a dynamic set of filter coefficients that change over time to generate a fifth signal,
wherein addition of the static first set of filter coefficients in the filtering is configured to improve a single talk echo performance by 5 to 10 dB compared to filtering the first signal using only the dynamic set of filter coefficients.

* * * * *